United States Patent
Fallon

(10) Patent No.: US 10,982,775 B2
(45) Date of Patent: Apr. 20, 2021

(54) METAL-COATED SEAT RETENTION GROOVE

(71) Applicant: Mueller International, LLC, Atlanta, GA (US)

(72) Inventor: Timothy Quinn Fallon, Geneva, IL (US)

(73) Assignee: Mueller International, LLC, Atlanta, GA (US)

(*) Notice: Subject to any disclaimer, the term of this patent is extended or adjusted under 35 U.S.C. 154(b) by 0 days.

(21) Appl. No.: 16/507,409

(22) Filed: Jul. 10, 2019

(65) Prior Publication Data

US 2021/0010603 A1 Jan. 14, 2021

(51) Int. Cl.

| | |
|---|---|
| *F16K 1/42* | (2006.01) |
| *F16K 1/18* | (2006.01) |
| *F16K 1/20* | (2006.01) |
| *F16K 1/226* | (2006.01) |
| *F16K 1/48* | (2006.01) |
| *F16K 5/06* | (2006.01) |

(52) U.S. Cl.
CPC ............ *F16K 1/422* (2013.01); *F16K 1/18* (2013.01); *F16K 1/427* (2013.01); *F16K 1/2057* (2013.01); *F16K 1/2064* (2013.01); *F16K 1/2263* (2013.01); *F16K 1/2265* (2013.01); *F16K 1/482* (2013.01); *F16K 5/0626* (2013.01)

(58) Field of Classification Search
CPC .... F16K 1/2057; F16K 1/2064; F16K 1/2263; F16K 1/2265; F16K 1/427
See application file for complete search history.

(56) References Cited

U.S. PATENT DOCUMENTS

| | | | | |
|---|---|---|---|---|
| 5,371,944 A | * | 12/1994 | Guenther | ................ F02B 77/11 29/888.061 |
| 2005/0151107 A1 | * | 7/2005 | Shu | ........................ F16K 5/0694 251/214 |
| 2012/0186669 A1 | * | 7/2012 | Avdjian | ................ F16K 15/028 137/511 |

OTHER PUBLICATIONS

Henry Pratt Company; Brochure for AWWA Butterfly Valves, copyright 2012, 5 pgs.

* cited by examiner

*Primary Examiner* — Hailey K. Do
(74) *Attorney, Agent, or Firm* — Taylor English Duma LLP

(57) ABSTRACT

Disclosed is a valve comprising: an annular body defining a body bore having a bore axis, the body further defining a channel coannular with the bore, the channel comprising an axially outer edge defining a seat retention groove, the seat retention groove comprising a metal barrier; an annular valve seat positioned in the channel, the valve seat comprising a radially inner surface; and a valve element positioned in the bore and coupled to the body, the valve element comprising a rotatable disc configured to rotate about and between a closed position, in which the rotatable disc is configured to prevent fluid from flowing through the valve, and an open position, in which the rotatable disc is configured to allow maximum fluid flow through the valve, the radially inner surface of the valve seat configured to seal against the rotatable disc in the closed position.

19 Claims, 7 Drawing Sheets

METAL-COATED SEAT RETENTION GROOVE

TECHNICAL FIELD

This disclosure relates to valves. More specifically, this disclosure relates to a metal-coated seat retention groove on a valve body.

BACKGROUND

Valve bodies are typically made from cast iron or steel. In a butterfly valve, a rotatable disc can form a seal with a valve seat made of a flexible material, such as rubber. One way to secure or fasten the valve seat is through a mechanism involving inserting a head of a bolt into a retention groove. The groove is a wetted area, meaning it is exposed to fluids flowing through the valve. Wetted areas can be coated with epoxy to prevent corrosion. Coating the groove with epoxy, however, can cause the available space in the groove to narrow, such that the head of the bolt can no longer fit.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a valve comprising: an annular body defining a body bore having a bore axis, the body further defining a channel coannular with the bore, the channel comprising an axially outer edge defining a seat retention groove, the seat retention groove comprising a metal barrier; an annular valve seat positioned in the channel, the valve seat comprising a radially inner surface; and a valve element positioned in the bore and coupled to the body, the valve element comprising a rotatable disc configured to rotate about and between a closed position, in which the rotatable disc is configured to prevent fluid from flowing through the valve, and an open position, in which the rotatable disc is configured to allow maximum fluid flow through the valve, the radially inner surface of the valve seat configured to seal against the rotatable disc in the closed position.

Also disclosed is a valve comprising: a valve body defining a body bore having a bore axis, the body further defining a channel coannular with the bore, the channel comprising an axially outer edge defining an annular seat retention groove, wherein the groove is coannular with the bore of the valve body; a corrosion-resistant metal barrier over the seat retention groove, the barrier defining a first and a second edge, each barrier edge coannular with the bore; and an epoxy coating over the first and the second barrier edges.

Also disclosed is a method of manufacturing a valve with a corrosion-resistant barrier, the method comprising: obtaining a valve body defining a body bore having a bore axis, the body further defining a channel coannular with the bore, the channel comprising an axially outer edge defining a seat retention groove; and thermal spraying a corrosion-resistant barrier over the seat retention groove, wherein thermal spraying comprises heating a material forming the corrosion-resistant barrier, and spraying a plurality of particles resulting from heating the material.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
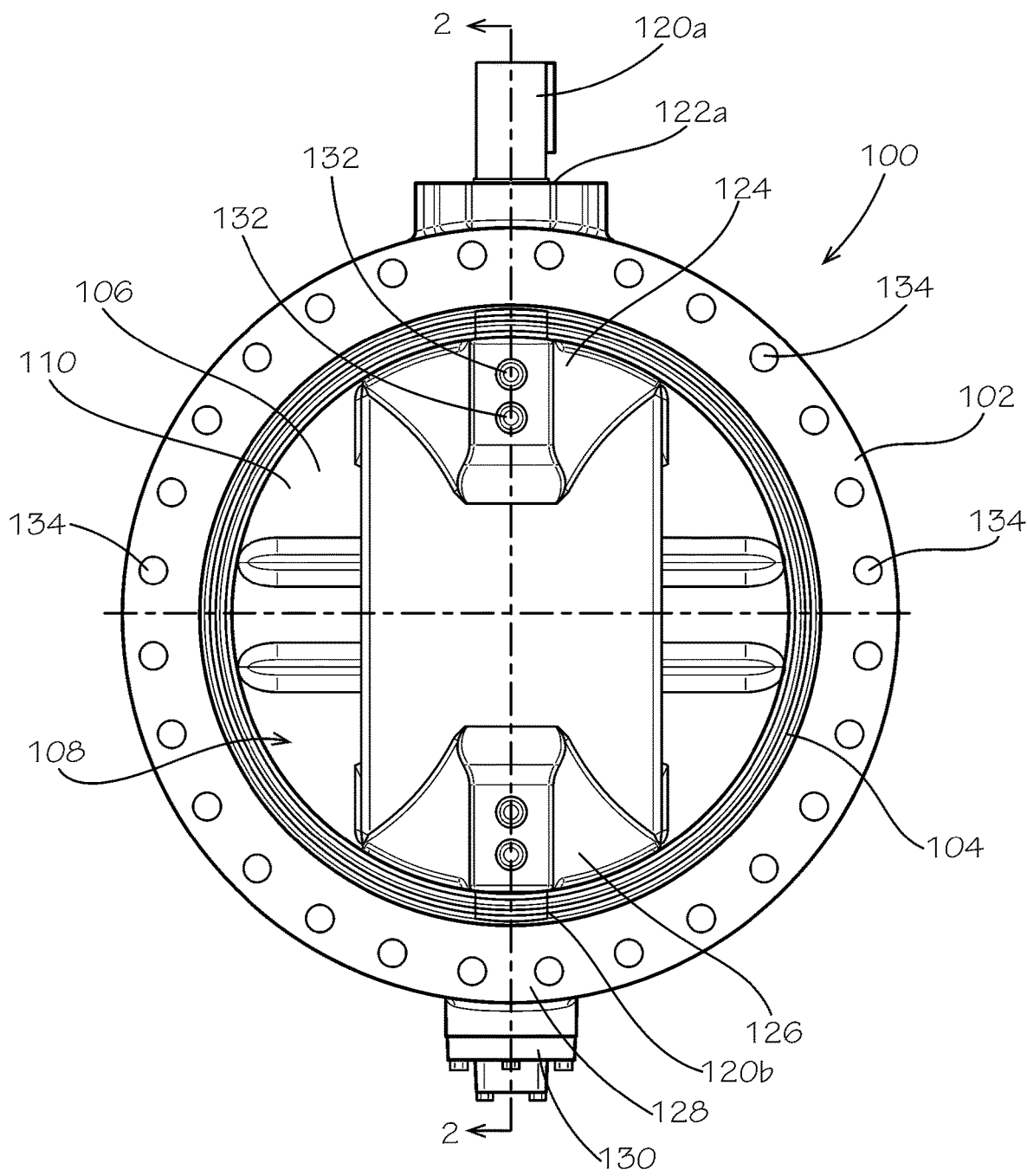
FIG. 1 is a front view of a valve in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

The use of the directional terms herein, such as right, left, front, back, top, bottom, and the like can refer to the orientation shown and described in the corresponding figures, but these directional terms should not be considered limiting on the orientation or configuration required by the present disclosure. The use of ordinal terms herein, such as first, second, third, fourth, and the like can refer to elements associated with elements having matching ordinal numbers. For example, a first light bulb can be associated with a first light socket, a second light bulb can be associated with a second light socket, and so on. However, the use of matching ordinal numbers should not be considered limiting on the associations required by the present disclosure. An element such as a light bulb can be a genus element that encompasses species elements such as an upper light bulb and a lower light bulb. As such, a numeric designator such as 100 can refer to the light bulb and an alphanumeric designator such as 100a and 100b can refer to the upper light bulb and the lower light bulb, for example and without limitation.

Disclosed is a valve with a corrosion-resistant barrier and associated methods, systems, devices, and various apparatus. It would be understood by one of skill in the art that the valve is described in but a few exemplary embodiments among many. No particular terminology or description should be considered limiting on the disclosure or the scope of any claims issuing therefrom.

FIG. 1 is a front view of a valve 100 in accordance with one aspect of the present disclosure. The valve 100 can comprise a body 102, a valve seat 104, and a valve element 106. The valve body 102 can define a bore 108, the bore 108 defining an inlet end 220 (shown in FIG. 2) and an outlet end 230 (shown in FIG. 2), a flow of fluid through the valve 100 configured to flow from the inlet end 220 to the outlet end 230, or vice versa. The valve element 106 can be disposed within the bore 108. The valve element 106 can be configured to seal against the valve seat 104. The valve element 106 in FIG. 1 is shown in a closed position. In the aspect shown, the valve 100 can be a butterfly valve, and the valve element 106 can be a rotatable disc 110.

The valve 100 can further comprise a valve shaft 120 attached to the disc 110, the valve shaft 120 rotatable about its axis within a shaft hole 122 (shown in FIG. 2) of the valve body 102, allowing the disc 110 to rotate. In the current aspect and without limitation, the valve 100 can comprise two stems or shafts 120, a first upper shaft 120a attached to a top 124 of the valve element 106 and a second lower shaft 120b (hidden within the valve body 102 in the view of FIG. 1) attached to a bottom 126 of the valve element 106. A bottom 128 of the valve body 102 can define a lower shaft hole 122b (shown in FIG. 2) therethrough and can comprise a bottom cap 130 that captures the lower shaft 120b, allowing the lower shaft 120b to rotate therein. The upper shaft 120a can extend through an upper shaft hole 122a at the top of the valve body 102 to engage with a valve actuator (not shown), such as a hand wheel, lever, gear box, or any other desired actuator. The shaft 120 can be attached to the disc 110 by bolts or any other attachment mechanism. The valve body 102 can define holes 134 near its outer circumference, the holes 134 configured to receive attachment mechanisms such as bolts for joining a flange (not shown) on an adjacent piping element or a mechanical joint, such as seal gland for joining plain end piping elements.

Figure 2:
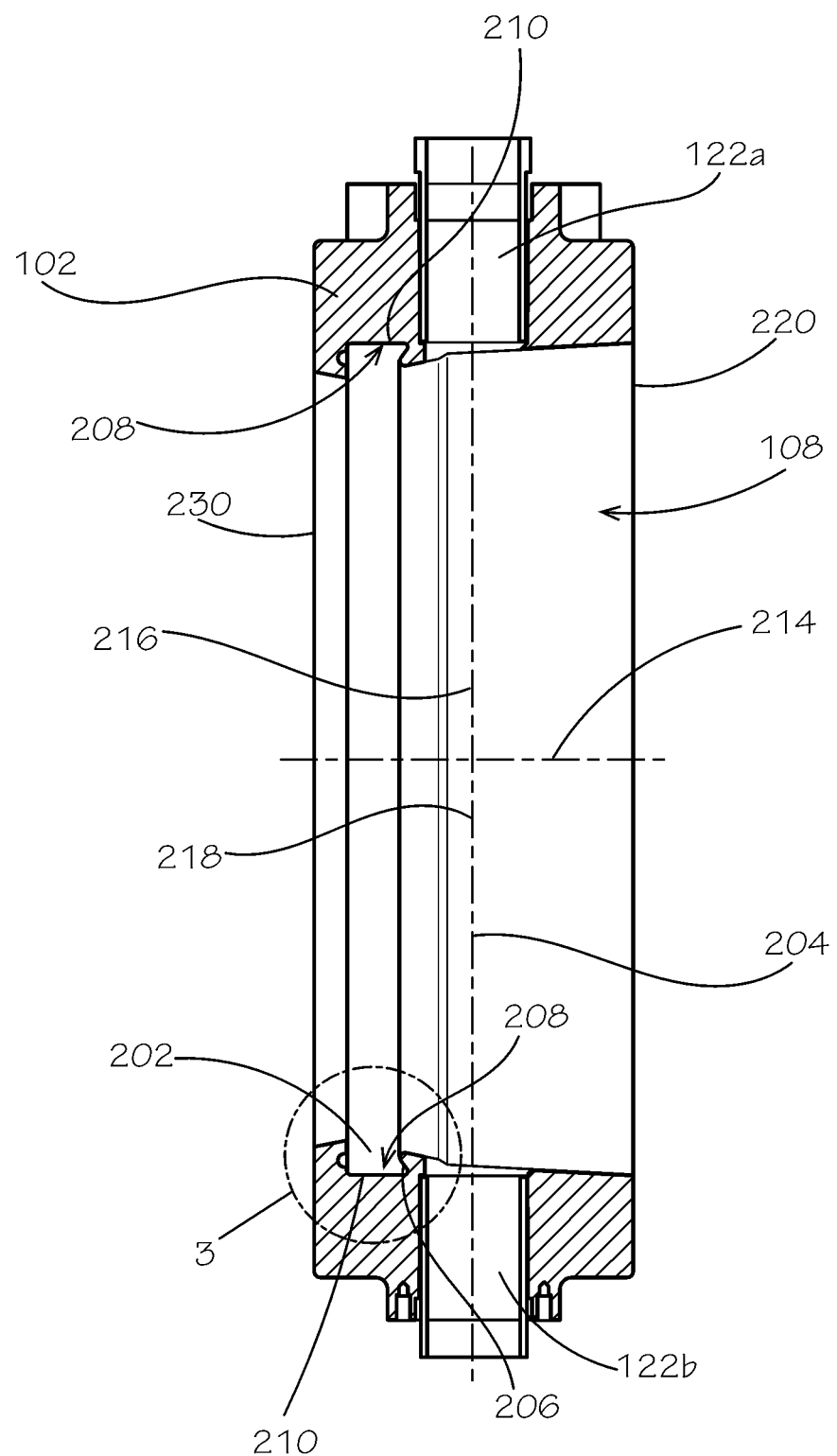
FIG. 2 is a cross-sectional view of a valve body of the valve of FIG. 1, taken along line 2-2 of FIG. 1.

FIG. 2 is a cross-sectional view of the valve body 102, taken along line 2-2. As shown, the valve element 106 and the valve seat 104 are removed. The valve body 102 can define a rotation axis 216 through the shafts 120 and the disc 110. The disc 110 can rotate about the axis 216 between a closed position, in which the rotatable disc 110 is configured to prevent fluid from flowing through the valve 100, and an open position, in which the rotatable disc 110 is configured to allow maximum fluid flow through the valve 100. The bore 108 can define a bore axis 214 running longitudinally through the bore. A transverse cross section of the bore can be defined by a middle plane 218 that contains the rotation axis 216.

Figure 3:
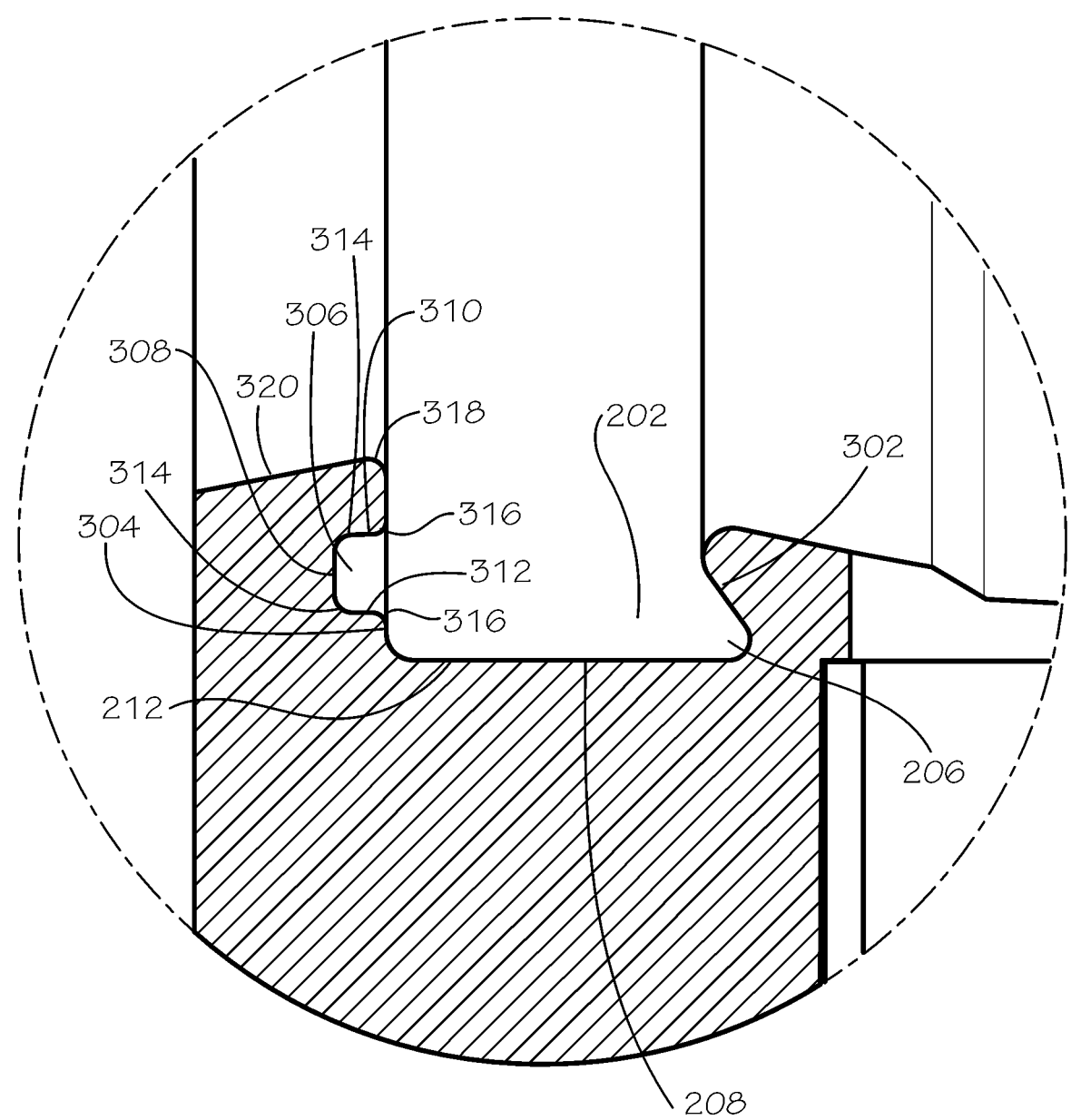
FIG. 3 is a detail view of a channel of the valve body of FIG. 2 taken from Detail 3 in FIG. 2.
Figure 4:
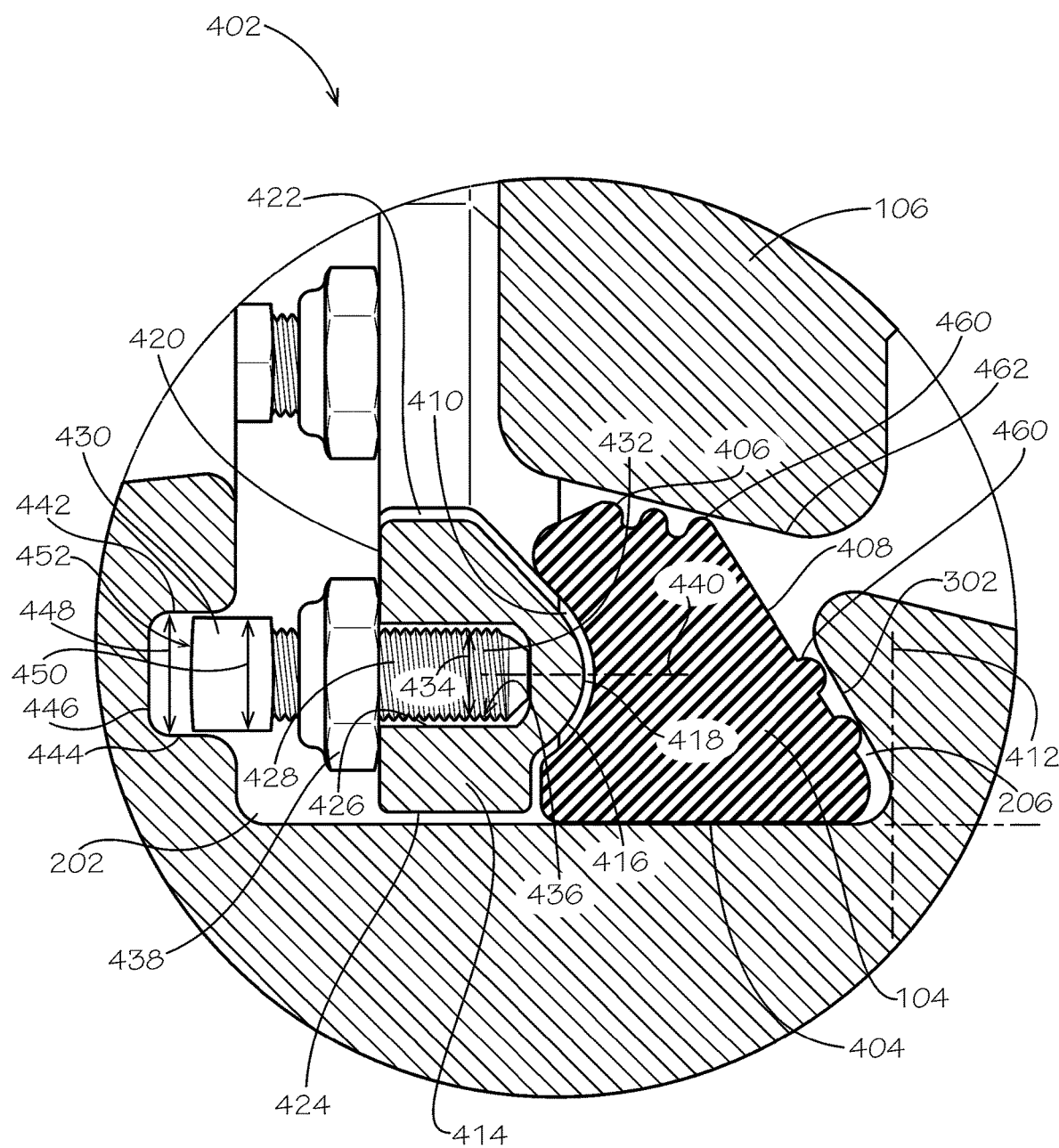
FIG. 4 is a cross-sectional view of the channel of FIG. 3, further comprising a seating mechanism.

The valve body 102 can define a channel 202 configured to house a seating mechanism 402 (shown in FIG. 4). The channel 202 can be offset from the middle plane 204 of the valve body 102. The channel 202 can comprise an annular conduit 206. The channel can define a surface 208. A cylindrical channel bottom portion 210 of the surface can be parallel to the bore axis 214 of the valve body 102. An axial cross-section of the shaft holes 122a,b can be seen in this view. Detail 3 is shown in FIG. 3.

FIG. 3 is a detail view of the channel 202 of the valve body 102 (shown in FIG. 1) of FIG. 2 taken from Detail 3 in FIG. 2. The channel 202 can further comprise an axially inner edge 302 that is angled with respect to the plane 204 (shown in FIG. 2) of the valve body 102. The conduit 206 can be located where the inner edge 302 and the channel surface 208 meet. The channel 202 can further comprise an axially outer edge 304 that is parallel to the plane 204. The outer edge 304 can further define a retention groove 306 that extends annularly around the bore 108 (shown in FIG. 2). The groove 306 can comprise an inside wall 308, a radially inner wall 310, and a radially outer wall 312. The groove walls 308,310, 312 can define a rectangular cross-section, and the groove 306 can comprise inside corners 314 and outside corners 316 that can be curvilinear fillets, for example and without limitation. The axially outer edge 304 of the channel 202 can meet a valve opening wall 320 at an edge 318 of the valve body 102, wherein the edge 318 can be a fillet with a curvilinear cross-section.

FIG. 4 is the same cross-sectional view of the channel 202 of FIG. 2, further comprising a seating mechanism 402. The seating mechanism 402 can comprise the valve seat 104. The valve seat 104 can have a radially outer surface 404 opposite a radially inner surface 406. An axially inner surface 408 and an axially outer surface 410 can extend between the radially outer surface 404 and the radially inner surface 406. The axially inner surface 408 can be angled with respect to a perpendicular 412 of the radially outer surface 404, the seat 104 profile configured to match the conduit 206 profile, such that the space therebetween can be sealed off from fluids. The axially inner surface 408 and the radially inner surface 406 can comprise ribs 460 running coannularly with the valve seat 104, the ribs 460 configured to make first contact with the channel inner edge 302 or an edge 462 of the valve element 106, in order to create a better sealing interface.

The valve seat 104 can be monolithic and can be constructed from a single or continuous piece of material. In one aspect, the valve seat 104 can be constructed from a deformable material such as a polymeric material, a polymeric-lubricant mixture and the like. In other aspects, the entire valve seat 104 can be formed from the deformable material. In some of these aspects, the valve seat 104 can be homogenous throughout the entire valve seat 104. The polymeric material of the valve seat 104 can be ethylene propylene diene monomer ("EPDM") rubber; however, in other aspects, the polymeric material can be a different rubber formulation such as Buna-N, neoprene, nitrile, Viton, silicone rubber or other rubber formulations. In some aspects, the polymeric material can be a natural rubber.

The seating mechanism 402 can further comprise a segment 414 adjacent to the axially outer surface 410 of the valve seat 104. A plurality of segments 414 can extend end-to-end around the channel 202. An axially inner side 416 of the segment 414 can comprise a convex portion 418 configured to press the seat 104 into the conduit 206. The segment 414 can also comprise an axially outer side 420, a radially inner side 422, and a radially outer side 424. The axially outer side 420 can define a hole 426, the hole 426 configured to receive a bolt 428. The bolt 428 can comprise a head 430 and a threaded tail 432. The tail 432 can be inserted into the hole 426 of the segment 414. The hole 426 can be annular and be sized with a diameter 434 greater than a diameter 802 (shown in FIG. 8) of the tail 432, such that the threads of the tail 432 do not engage with an annular side 436 of the hole 426.

The head 430 of the bolt 428 can be a regular polygon, such as a square or a hexagon. The groove 306 of the channel 202 can receive the head 430 and be configured to restrict rotation of the bolt about its axis 440. A nut 438 can be disposed on the tail 432 of the bolt 428, such that rotation of the nut 438 in one direction moves the nut 438 axially inward towards the conduit 206. The nut 438 can be a nyloc nut configured to resist loosening, or any other similar alternative known in the art. The segment 414 can be pushed by the nut 438 in the same direction, squeezing the seat 104 and forcing the deformable radially inner surface 406 of the seat 104 further radially inward. As such, the seat 104 can contact a greater portion of the valve element 106 (shown in FIG. 1) when the valve 100 (shown in FIG. 1) is closed.

The channel retention groove 306, or more simply the groove 306, can comprise a radially inner portion 442, a radially outer portion 444, and an axially outer portion 446 therebetween. The radially inner portion 442 and the radially outer portion 444 can define a width 448 therebetween. The width 448 can be slightly larger than a height 450 of a face 452 of the bolt head 430. The slightly larger width 448 can allow for a non-corrosive layer or cover to be applied (such as by spraying) to the groove 306, such that the groove 306 comprising the layer can still receive the bolt head 430.

Figure 5:
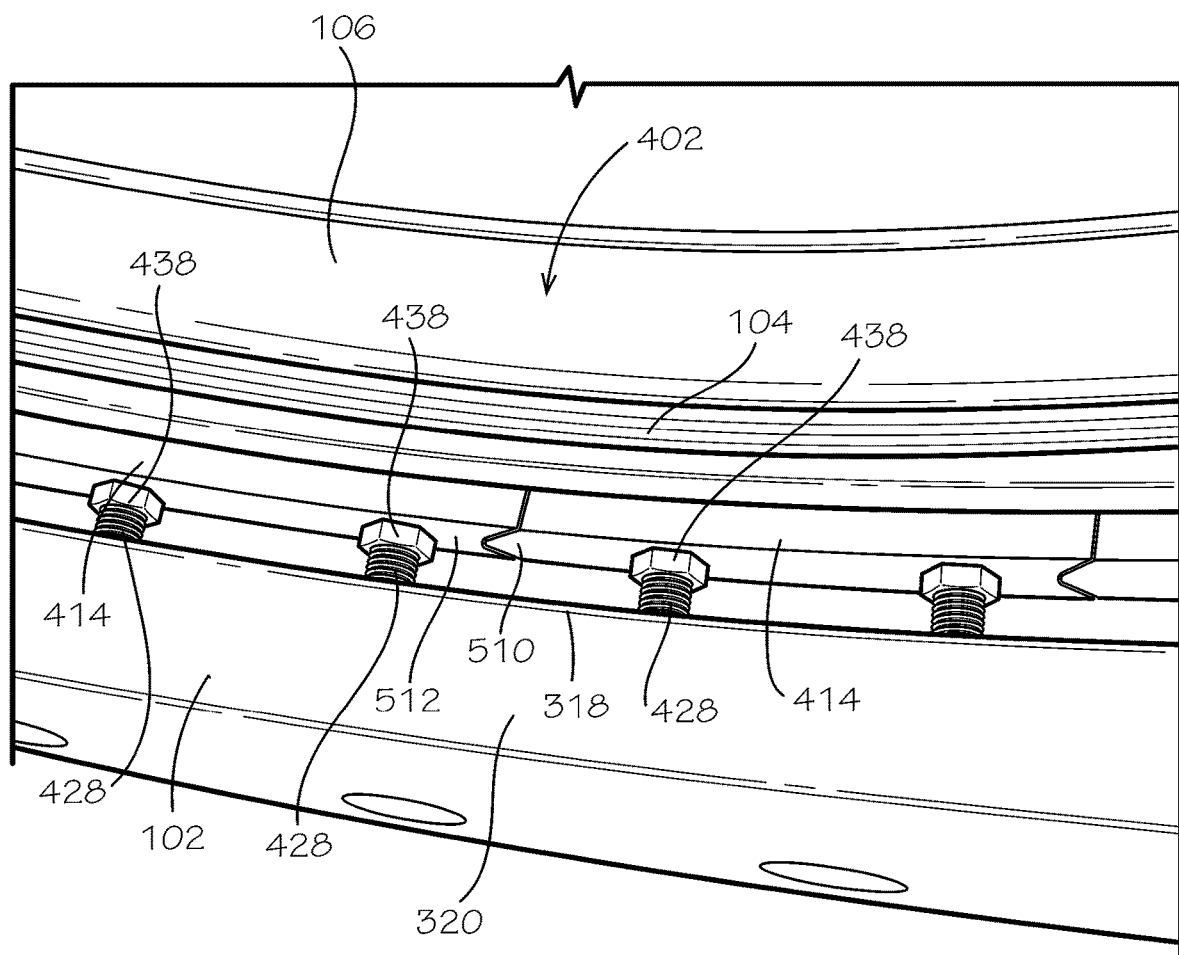
FIG. 5 is a perspective view of a portion of the seating mechanism of FIG. 4.

FIG. 5 is a perspective view of the seating mechanism 402. In this view, one can see the valve element 106 (reversed from its operational configuration, such that the valve seat 104 can be maintained), the valve body 102, the valve seat 104, the segments 414, the bolts 428, and the nuts 438. The groove 306 cannot be seen from this angle, but it exists below the axially inner edge 318 of the valve opening wall 320. The heads 430 (shown in FIG. 2) of the bolts 428 can be inside the groove 306 (shown in FIG. 3) and prevented from rotation, and the nuts 438 can be tightened up against the segments 414, thereby securing the valve seat 104. Each segment 414 can comprise a tongue end 510 and a groove end 512, the groove end 512 of each segment 414 configured to receive the tongue end of an adjacent segment 414, thereby better controlling the contour of a ring of segments around the valve body 102 annulus.

Figure 6:
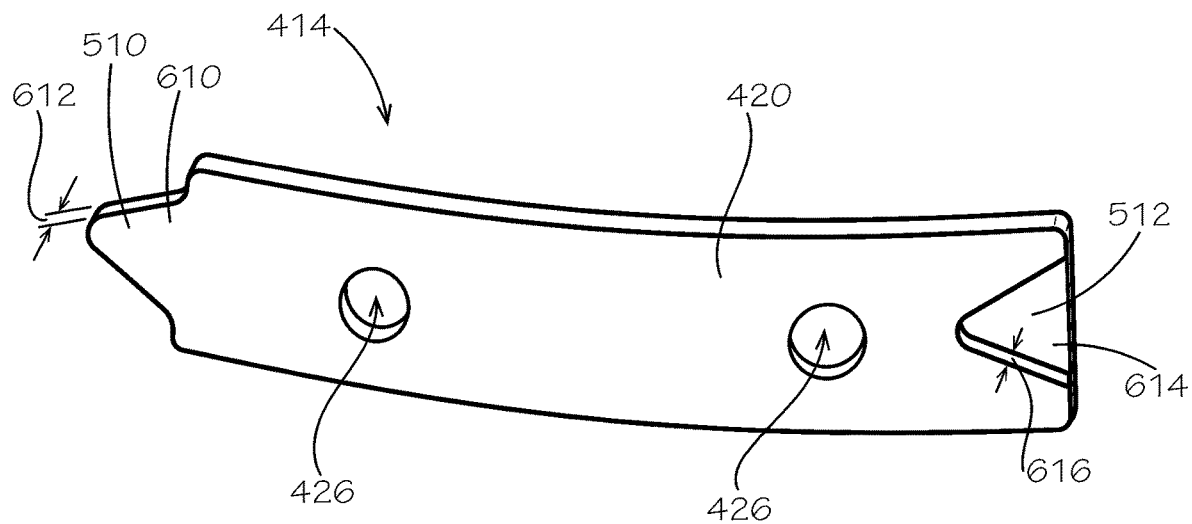
FIG. 6 is a perspective view of a segment of the seating mechanism of FIG. 4, showing an axially outer side.

FIG. 6 is a perspective view of the axially outer side 420 of the segment 414. The segment 414 can comprise two holes 426 configured to receive the tails 432 of the bolts 428 (shown in FIG. 4). The tongue end 510 can comprise a tongue 610 that is flush, or coplanar, with the segment on the axially outer side 420. A thickness 612 of the tongue 610 can be less than a thickness 710 (shown in FIG. 7) of the segment 414 defined by a distance between the axially outer side 420 and an innermost portion of the axially inner side 416. The groove end 512 can define a groove 614, the groove having a depth 616 (measured in a direction along the bore axis 214 when the segment 414 is fastened to the valve body 102) less than the segment thickness 710 (shown in FIG. 7), the groove 614 configured to receive the tongue 610 without substantial space therebetween.

Figure 7:
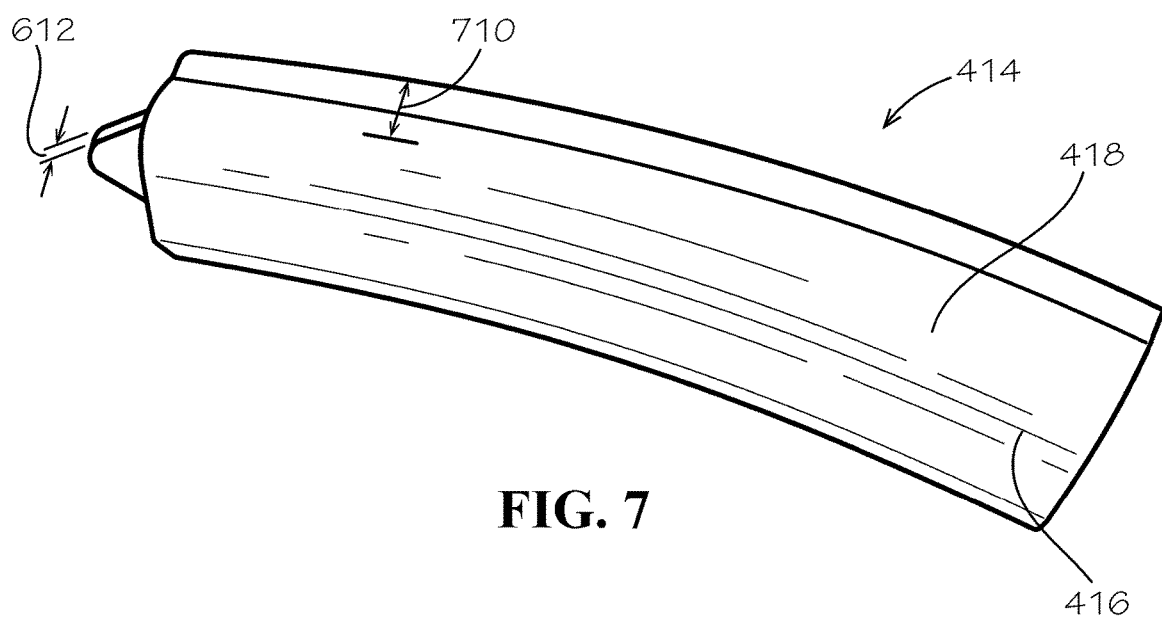
FIG. 7 is a perspective view of the segment of FIG. 6, showing an axially inner side.

FIG. 7 is a perspective view of the axially inner side 416 of the segment 414. In this view, the convex portion 418 can be seen, which is configured to push into the valve seat 104 (not shown). The tongue thickness 612 and the segment thickness 710 are more clearly shown.

Figure 8:
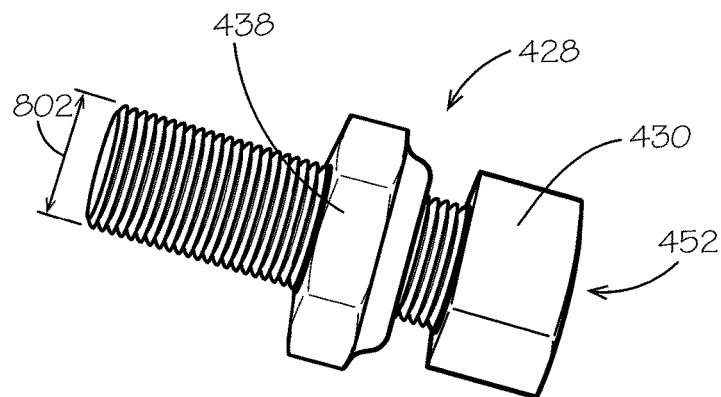
FIG. 8 is a perspective view of a bolt and a nut of the seating mechanism of FIG. 4.

FIG. 8 is a perspective view of the bolt 428 with the nut 438. In the current aspect, the bolt head 430 has a square face 452. A square head 430 can provide a greater contact area for the radially inner portion 442 (shown in FIG. 4) and the radially outer portion 444 (shown in FIG. 4) of the groove 306 (shown in FIG. 3), such that the nut 438 can be tightened against the segment 414 (shown in FIG. 4) with a greater torque.

Figure 9:
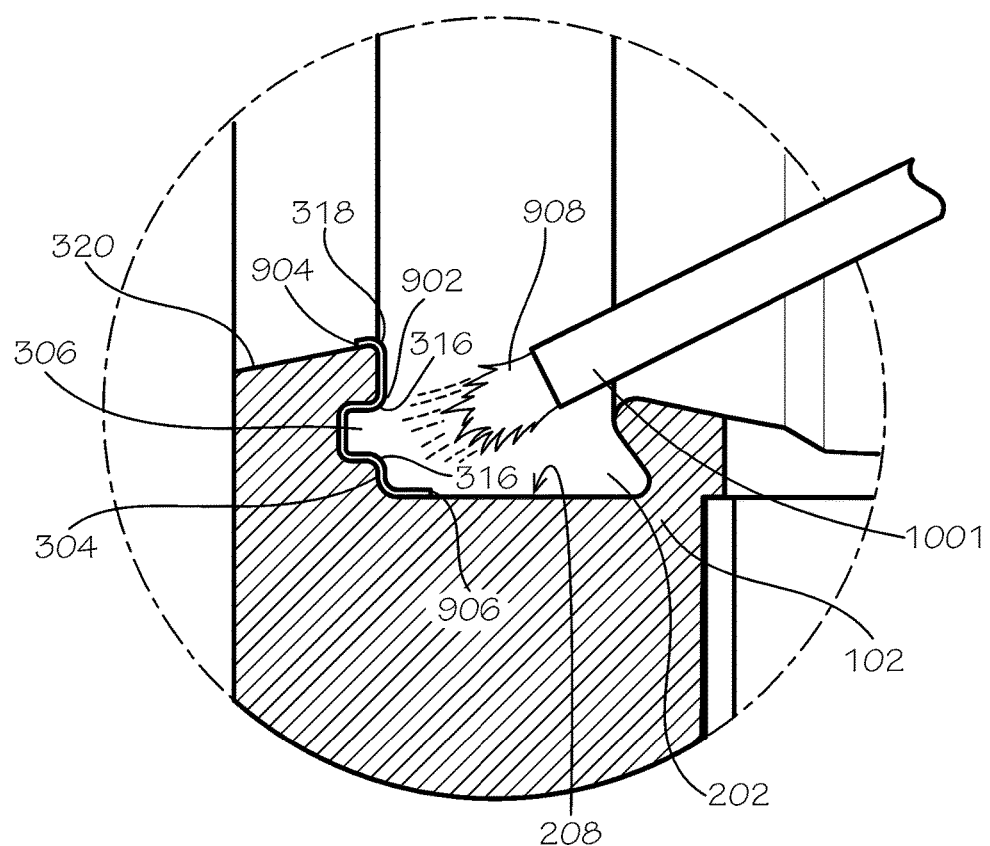
FIG. 9 is a cross-sectional view of the channel of FIG. 2 during a coating process to add a barrier to the channel.

FIG. 9 is the cross-sectional view of FIG. 2, wherein the groove 306 is coated with a barrier 902. The valve body 102 is typically made from cast iron or steel, materials which are susceptible to corrosion. Surfaces which are exposed to fluids are called wetted surfaces, which may require protection from corrosion. Thermosetting epoxy based coatings can provide such protection, in the form of barriers 902 on the wetted surfaces. The AWWA C504 Butterfly Valve Standard requires a minimum epoxy coating thickness of 8 mils (0.008") to be applied to unprotected ferrous surfaces. Using epoxy to protect the retention groove 306, however, can make it difficult to install the seating mechanism 402 (shown in FIG. 4). The required thickness of the epoxy coating can interfere with placing the bolt heads 430 (shown in FIG. 4) into the groove 306 by decreasing the size of the groove 430. Even if the seating mechanism 402 can be installed, the torque used to tighten the nuts 438 (shown in FIG. 4) can damage an epoxy barrier 902. Each time the seat 104 (shown in FIG. 1) is replaced or reinstalled, the epoxy barrier 902 can be further damaged, such that epoxy barrier 902 must be reapplied. Epoxy can be reapplied after the seating mechanism 402 has been reinstalled, so that removing all the bolts 428 during seat 104 reinstallation is not necessary. Reapplication, however, is made more difficult because there are numerous crevices between the bolts 428 and the groove 306 which are difficult to reach. In addition, some installations may require holiday-free coating on all internal wetted surfaces. Using epoxy for such holiday-free coatings may require a thickness in the range of 18-24 mils (0.018"-0.024"). This thickness can render the groove 306 unsuitable for installing the seating mechanism 402.

Applying a metal barrier, such as by a plasma or thermal spraying process (discussed more fully in reference to FIG. 10), may alleviate some of the problems associated with an epoxy barrier. For example, a stainless steel barrier 902 can be thinner than an epoxy coating and provide similar or superior protection. For example and without limitation, the stainless steel barrier can have a thickness of approximately 0.004 inches or 0.007 inches. The plasma spray coating process can be configured to apply the stainless steel such that the stainless steel will not flake off.

The barrier 902 can extend completely around the annular groove 306, and in the cross-sectional view of FIG. 9, the barrier 902 can extend to cover different portions in various aspects. In the aspect shown, the barrier 902 can extend from a first barrier edge 904 at the edge 318 of the valve opening wall 320 to a second barrier edge 906 at the channel surface 208 proximate the axially outer edge 304. In other aspects, the barrier 902 can extend slightly beyond the outside corners 316 of the groove 306, or the barrier 902 can extend over the whole channel 202, for example and without limitation.

The spray process may not define a sharp or a clean line at the barrier edges 904,906. The barrier edges 904,906 may instead define a tapering off in thickness. In other aspects, tapes or other blocking mechanisms appropriate for high temperature spraying can be used to create a clean barrier edge 904,906. In accordance with one aspect of the present disclosure, the method of applying the metal barrier 902 can comprise directing a plasma spray 908 at the groove 306, spraying metal toward the groove 306, and rotating the valve body 102 about the bore axis 214 (not shown) such that the metal barrier 902 covers the groove 306. In various aspects, the plasma spray 908 can be directed by a nozzle 1001 in various motions to affect the barrier 902 properties, such as thickness, width, and uniformity. For example, the plasma spray 908 can remain in a fixed position. The plasma spray 908 can also move translationally in a radially inward and outward direction as the valve body 102 is rotating, in order to achieve a desired width between the first and second barrier edges 904,906. The plasma spray 908 can also move according to the contours of the valve body 102, the movement comprising a combination of rotations and translations, such that the spray 908 can maintain a direction facing the target surface at all times.

The barrier 902 coating can be applied to bare metal on the valve body 102. As such, bare corrodible metal such as cast iron or steel can be exposed on the valve body 102 surface at the barrier edges 904,906. Epoxy can be applied to the valve body 102, and particularly at and over the barrier edges 904,906, after the plasma spray process.

Figure 10:
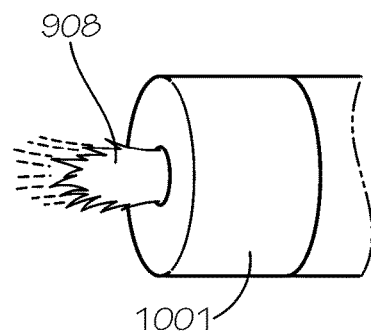
FIG. 10 is a perspective view of a thermal spray exiting a nozzle.

As shown in FIG. 10 in accordance with one aspect of the present disclosure, the barrier 902 (not shown) can be applied by a thermal spray coating process such as plasma spraying. The barrier 902 can be formed of a non-corrosive or corrosion-resistant metal, such as 316 stainless steel or bronze. Thermal spraying techniques are coating processes in which melted or heated materials are sprayed onto a surface. The coating precursor, or feedstock, can be heated by electrical means, such as by plasma or arc, or chemical means, such as by combustion flame. Thermal spraying can provide thin to thick coatings, ranging from approximately 20 microns to several millimeters in thickness, depending on the process and feedstock. Thermal spraying can cover a large area at high deposition rate as compared to other coating processes such as electroplating, physical and chemical vapor deposition. Coating materials available for thermal spraying can include metals, alloys, ceramics, plastics and composites. They can be fed in powder or wire form, heated to a molten or semimolten state, and accelerated towards substrates in the form of micrometer-size particles. Combustion or electrical arc discharge can be used as the source of energy for thermal spraying. The spray 908 of particles can be directed towards a target by the nozzle 1001. Resulting coatings are made by the accumulation of numerous sprayed particles. The surface, such as of the valve body 102, may not heat up significantly, allowing the coating of flammable substances.

Coating quality can be assessed by measuring its porosity, oxide content, macro and micro-hardness, bond strength and surface roughness. Generally, the coating quality increases with increasing particle velocities. Thermal spraying includes numerous variations, including plasma spraying, detonation spraying, wire arc spraying, flame spraying, high velocity oxy-fuel coating spraying (HVOF), high velocity air fuel (HVAF), warm spraying, and cold spraying. Plasma spraying uses a high-temperature plasma jet generated by arc discharge with temperatures that can be above 15,000 K, making it possible to spray refractory materials such as oxides.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve comprising:
a valve body defining a body bore having a bore axis, the valve body further defining a channel coannular with the body bore and a valve opening wall, the channel comprising a channel surface, an inner edge, and an outer edge defining a seat retention groove, the outer edge meeting the valve opening wall, the seat retention groove comprising a metal barrier, the metal barrier defining a first edge and a second edge, the first edge oriented at the valve opening wall and the second edge oriented at the channel surface;
an annular valve seat positioned in the channel, the annular valve seat comprising a radially inner surface; and
a valve element positioned in the body bore and coupled to the valve body, the valve element comprising a rotatable disc configured to rotate about and between a closed position, in which the rotatable disc is configured to prevent fluid from flowing through the valve, and an open position, in which the rotatable disc is configured to allow maximum fluid flow through the valve, the radially inner surface of the annular valve seat configured to seal against the rotatable disc in the closed position.

2. The valve of claim 1, further comprising a seating mechanism, wherein the seating mechanism comprises a segment adjacent to an outer surface of the annular valve seat, the segment configured to hold the annular valve seat in the channel and engage the seat retention groove.

3. The valve of claim 2, wherein the seating mechanism further comprises a bolt, wherein the bolt comprises a head that is received by the seat retention groove, the seat retention groove configured to prevent the bolt from rotating about a bolt axis.

4. The valve of claim 3, wherein the bolt comprises a threaded tail that is received by a hole in an outer side of the segment.

5. The valve of claim 4, further comprising a nut disposed on the bolt, wherein rotating the nut in a first direction tightens the segment against the annular valve seat.

6. The valve of claim 1, wherein the valve body comprises a corrodible metal.

7. The valve of claim 6, wherein the valve body comprises cast iron.

8. The valve of claim 6, wherein the metal barrier is a corrosion-resistant metal barrier.

9. The valve of claim 8, wherein the corrosion-resistant metal barrier is stainless steel.

10. The valve of claim 9, wherein the stainless steel is deposited by plasma spraying.

11. The valve of claim 5, wherein the barrier is deposited by thermal spraying.

12. A valve comprising:
a valve body defining a body bore having a bore axis, the valve body further defining a channel coannular with the body bore, the channel comprising an outer edge defining an annular seat retention groove, wherein the annular seat retention groove is coannular with the body bore of the valve body;
a corrosion-resistant metal barrier over the annular seat retention groove, the corrosion-resistant metal barrier defining a first edge and a second edge, each of the first edge and second edge coannular with the body bore; and
an epoxy coating over the first and the second edges.

13. The valve of claim 12, further comprising:
a compressible valve seat in the channel, the compressible valve seat comprising an outer surface;
a segment adjacent to the outer surface of the compressible valve seat, the segment comprising an outer side, the outer side defining a hole; and
a bolt comprising a bolt head and defining a bolt axis, the bolt head disposed in the annular seat retention groove, the annular seat retention groove preventing the bolt from rotating about the bolt axis.

14. A method of manufacturing a valve with a corrosion-resistant barrier, the method comprising:
obtaining a valve body defining a body bore having a bore axis, the valve body further defining a channel coannular with the body bore, the channel comprising an outer edge defining a seat retention groove; and
thermal spraying a corrosion-resistant barrier over the seat retention groove, wherein the corrosion-resistant barrier is metal, wherein thermal spraying comprises heating a material forming the corrosion-resistant barrier, and spraying a plurality of particles resulting from heating the material; and
applying epoxy to the valve body after thermal spraying the corrosion-resistant barrier.

15. The method of claim 14, wherein the seat retention groove is configured to receive a head of a bolt and to prevent the bolt from rotating about a bolt axis.

16. The method of claim 15, wherein the seat retention groove defines an inner wall, a radially inner wall, and a radially outer wall.

17. The method of claim 16, further comprising:
inserting a compressible valve seat in the channel, the compressible valve seat comprising an outer surface;
placing a segment at the axially outer surface of the compressible valve seat, the segment comprising an outer side, the outer side defining a hole;
placing a nut on the bolt;
placing a tail of the bolt in the hole of the segment; and
placing the head of the bolt in the seat retention groove.

18. The method of claim 14, wherein thermal spraying the corrosion-resistant barrier comprises of plasma spraying a stainless steel barrier.

19. The method of claim 18, obtaining the valve body comprises casting the valve body from cast iron.

\* \* \* \* \*